United States Patent [19]

Seeh et al.

[11] Patent Number: 5,096,207
[45] Date of Patent: Mar. 17, 1992

[54] CARTRIDGE SEAL WITH DUAL LIPPED SECONDARY SEAL

[75] Inventors: Reinhold Seeh, Weinheim; Rolf Vogt, Oftersheim; Rolf Drucktenhengt, Lampertheim-Hofheim, all of Fed. Rep. of Germany

[73] Assignee: Firma Carl Freudenberg, Weinheim, Fed. Rep. of Germany

[21] Appl. No.: 614,405

[22] Filed: Nov. 15, 1990

[30] Foreign Application Priority Data

Dec. 2, 1989 [DE] Fed. Rep. of Germany ....... 3940003

[51] Int. Cl.⁵ .................... F16K 41/08; F16C 33/74
[52] U.S. Cl. ............................. 277/35; 277/45; 277/48; 277/152; 277/153; 384/148; 384/484; 384/486
[58] Field of Search ............... 277/35, 37, 45, 47, 277/48, 152, 153; 384/147, 148, 484, 485, 486

[56] References Cited

U.S. PATENT DOCUMENTS

| | | | |
|---|---|---|---|
| 3,011,814 | 12/1961 | Rhoads et al. | 277/153 |
| 3,021,161 | 2/1962 | Rhoads et al. | 277/153 |
| 4,345,770 | 8/1982 | Seeh | 277/48 |
| 4,655,618 | 4/1987 | Labedan et al. | 384/486 |
| 4,721,312 | 1/1988 | Hornberger | 277/37 |
| 5,022,659 | 6/1991 | Otto | 384/486 X |
| 5,024,449 | 6/1991 | Otto | 384/485 X |
| 5,042,822 | 8/1991 | Dreschmann et al. | 277/152 X |

FOREIGN PATENT DOCUMENTS 337893 10/1989 European Pat. Off. ............. 277/152
3031870 3/1982 Fed. Rep. of Germany .

*Primary Examiner*—William A. Cuchlinski, Jr.
*Assistant Examiner*—J. Folker
*Attorney, Agent, or Firm*—Sprung Horn Kramer & Woods

[57] ABSTRACT

A cartridge seal is described where the outer ring 1 and the inner ring 4 are inseparably joined to each other. The outer ring has a circumferential groove 2 which is axially open in a direction toward the outside 14 and which is engaged by a first and second sealing lip of the inner ring 4. The second sealing lip 9 is formed by an extrusion of the protruding end of the first sealing lip 8. Both sealing lips 8, 9 contact their corresponding counter surfaces 6, 7 with circumferential sealing edges 10, 11.

13 Claims, 2 Drawing Sheets

CARTRIDGE SEAL WITH DUAL LIPPED SECONDARY SEAL

BACKGROUND OF THE INVENTION

The invention relates to a cartridge seal, including an outer ring with an annular recess, the cross section of which is axially expanded toward the exterior, and a main seal attached to the outer ring by means of vulcanization. This main seal fittingly contacts an inner ring. The latter is provided with an annular projection which at least partially radially extends over the recess in the vicinity of its orifice. A preliminary seal is provided which axially engages the recess and is attached to the annular projection by means of vulcanization. This seal contacts the recess relatively movably with a first and second sealing lip in the vicinity of two essentially radially opposing counter surfaces.

A cartridge seal of this type is known from the German Patent No. DE 30 31 870. It serves the purpose of sealing a wheel of a motor vehicle; however, it has not proven to be satisfactory to the extent desired. Particularly in cases when the outside of the seal is flooded with water, the sealing effect is less than satisfactory. Also, the cartridge seal includes four component parts which have to be manufactured individually, thus increasing the total production cost. Moreover, it poses a problem to combine these individual parts to form a complete constructional unit.

SUMMARY OF THE INVENTION

It is a principal object of the present invention to further develop cartridge seals of this type such that, when used to seal wheels of motor vehicles which are employed in rice fields, such seals ensure a substantially improved sealing effect while the manufacturing costs are reduced.

This object, as well as other objects which will become apparent in the discussion that follows, are accomplished, in accordance with the present invention, by providing a cartridge seal of the aforesaid kind with first and second sealing lips which contact, each with one sealing edge, their corresponding counter surfaces. The second sealing lip is a formed part of the front end of the first sealing lip, and it extends as one piece against the axial direction of the first sealing lip and engages the recess. The first and second sealing lips are thus associated with one another in series connection with respect to water intruding from the outside. Each of the two sealing lips essentially contacts its corresponding counter surface only in the area of a linear contact surface. In the area of this contact surface, there is a comparatively high specific surface pressure. This naturally improves the desired sealing effect. Moreover, in the cartridge seal in accordance with the invention, the second sealing lip is formed by a lug of the protruding end of the first sealing lip. The sealing edge of this part contacts the outer ring in an area which is located on approximately the same radial plane as the sealing edge of the first sealing lip. The elastic contact pressure of the two sealing edges at their corresponding counter surfaces is essentially based on elastic deformation forces which develop in the area of the second sealing lip during the insertion of the inner ring into the outer ring. Due to the mutual support, it has largely the same magnitude and in case of a radially directed displacement of the inner ring with respect to the outer ring, the deformation forces are not subject to any change and the sealing effect is hence not impaired. Axial relative displacements of the inner ring with respect to the outer ring are acceptable provided the aperture of the recess is sufficiently large.

A sealing gap can be disposed upstream of the second sealing lip in the direction toward the outside. On the one side, this gap can be bounded by the annular projection and on the other side by the outer ring. This reduces the risk that the first seal is directly exposed to sand and slurry.

With respect to reducing wear occurring in the area of the sealing gap, it has proven to be advantageous that the latter be bounded by a rubber layer on at least one side. Encrustations of oily particles are thus more readily removed when the seal is put in use again.

Between the outside and the second sealing lip, the course of the sealing gap can be redirected at least once. The redirection preferably ranges between 75° and 90°. This prevents to some extent intrusion of solid particles from the outside into the inside of the cartridge seal.

At its end facing toward the outside, the sealing gap can be bounded radially on the inside as well as on the outside by front surfaces which essentially are disposed on a corresponding radial plane and essentially extend in the radial direction. The dirt-repelling effect of the sealing gap effective in the direction toward the outside is thus even further improved.

An annular helical spring can press the first sealing lip against its corresponding counter surface. This annular helical spring, which can be made of a metallic material, ensures a balanced contact pressure over longer periods of time. Also, any occurring relaxation of the material of the sealing gap no longer impairs the desired sealing effect.

The sealing edges can be formed by converging boundary surfaces of the sealing lips, whereby the respective counter surfaces of the sealing lips which face in a direction toward the outside form a more acute angle A than the boundary surfaces converging therewith. The result is a certain conveying effect toward the outside. This prevents not only the intrusion of water and/or dirt but, moreover, it also favors the supply of lubricants from the interior of the wheel bearing into the area of the first and second sealing lips. This advantageously improves the service life.

The preferred embodiments of the present invention will now be described with reference to the accompanying drawings.

DESCRIPTION OF THE PREFERRED EMBODIMENTS

Figure 1:
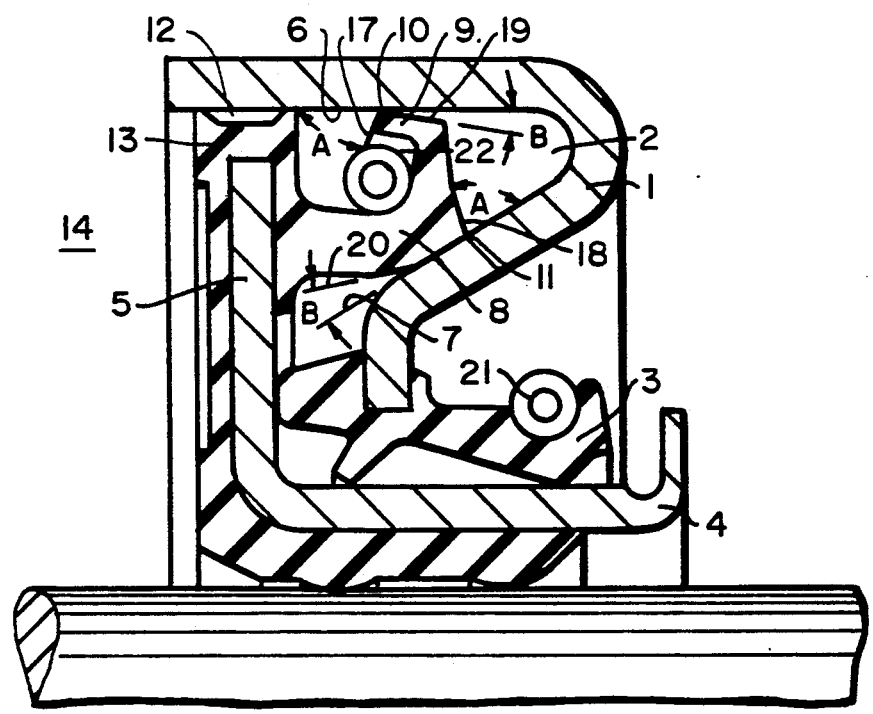
FIG. 1 is a cross-sectional view of a cartridge seal where the first sealing lip is pressed against its corresponding counter surface by means of an annular helical spring.

The cartridge seal of FIG. 1 includes an outer ring 1 and an inner ring 4 made of deep drawn sheet steel. The two parts are inseparably joined by means of an annular projection with a bordered end.

The outer ring 1 has an annular recess 2 which is axially open in the direction toward the outside 14. On its outside, this recess is bounded by a counter surface 6 extending parallel to the axis and on the inside by a counter surface 7 which forms an acute angle of 20° with the axis of rotation. The element of the profile of the outer ring 1 which radially protrudes toward the inside also forms a support for the main seal 3. The latter is configured in the manner of a sealing lip of a conventional radial shaft sealing ring and is provided with a sealing edge. An annular helical spring 21 made of an elastic material presses this sealing edge against the element of the profile of the inner ring 4 which extends parallel to the axis.

The inner ring 4 is provided with an annular projection 5 which approximately covers the orifice of the opening 2 in axial direction. At the same time, this annular projection 5 serves as a support for a first sealing lip 8. The latter is directly attached to the annular projection 5 by means of vulcanization and is made of an elastomeric material. Further, it contacts the recess 2 in the area of the conical surface 7, which bounds the latter on the inside, with a sealing edge 11 formed by two converging boundary surfaces 18, 20. The sealing edge is pressed against the corresponding counter surface 7 by means of an annular helical spring 22 made of a metallic material.

At the one end engaging the recess 2, the first sealing lip 8 has an annular formed projection which, as one piece, forms a second sealing lip 9. With a sealing edge 10, this lip 9 contacts its corresponding counter surface 6. In accordance with the present invention, this sealing edge 10 is formed by two converging boundary surfaces 17 and 19.

The boundary surfaces 17, 19 and 18, 20 which intersect in the area of the sealing edges 10 and 11 are associated with one another and with the respective counter surfaces 6, 7 such that liquid entering from the outside arrives at one boundary surface 17 or 18, which, together with the corresponding counter surface, encloses a greater angle A than the corresponding converging boundary surface 19 or 20. The result is a certain conveying or "pumping" effect in direction toward the outside 14. This does not only prevent surrounding water from entering the interior of the cartridge seal but also favors the additional supply of lubricant from the inside of the sealed wheel bearing to the dynamic sealing zones of the first and second sealing lips 8, 9. The comparatively smaller angle formed by the converging surfaces 19 and 20 together with the corresponding counter surfaces 7 and 6 is referenced as B.

In the embodiment of FIG. 1, a sealing gap is, in the direction toward the outside, disposed upstream of the first seal which includes the first and second sealing lips 8, 9. On its inside, this gap is bounded by a rubber coating 13 of the annular projection 5 of the inner ring 4 and on its outside by the outer ring 1 which is made of deep-drawn sheet steel. In the area of the axial ends of the sealing gap, the rubber layer 13 is extended to form sealing lips which radially protrude toward the outside and fittingly contact the outer ring 1. Particles stemming from the outside can thus no longer be deposited on the first seal.

Figure 2:
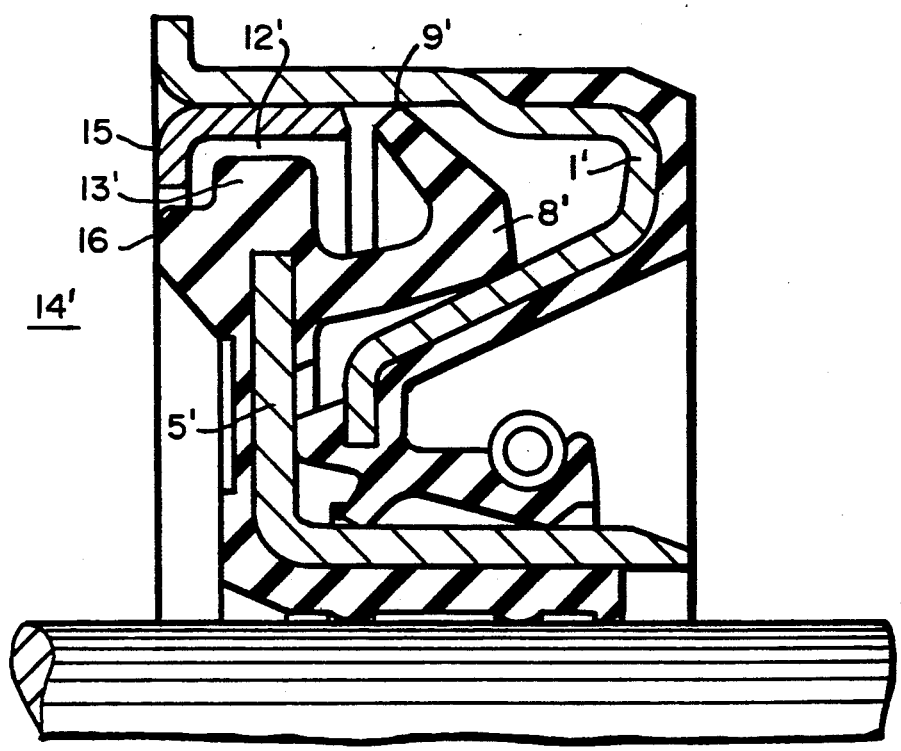
FIG. 2 is a cross-sectional view of a cartridge seal similar to that of FIG. 1 where the flow direction of the sealing gap provided between the first seal and the outside is redirected twice.

The embodiment of FIG. 2 is basically similar to the one described above. One difference, however, is that the sealing edge of the first sealing lip 8' is not pressed against the corresponding counter surface by means of an annular helical spring but essentially by the radial expansion of its diameter occurring during installation and by the elastic deformation of the second sealing lip 9'. As in the case of the embodiment of FIG. 1, both contact their corresponding counter surfaces with one sealing edge. Moreover, a gap seal 12' is disposed upstream of the first seal. At its inside, this gap is bounded by the rubber coating 13' of the annular projection 5' of the inner ring and, on its outside, by a part of a collar 15 made of metal. The latter is form-fittingly pressed in the outer ring 1'. In direction toward the outside 14', it is bounded by a radial surface which, corresponding to the radial surface 16, is also on the same radial plane.

Between the outside 14' and the first seal, the course of the sealing gap is redirected twice by 90°. This prevents dust and dirt from entering the interior of the cartridge seal.

Figure 3:
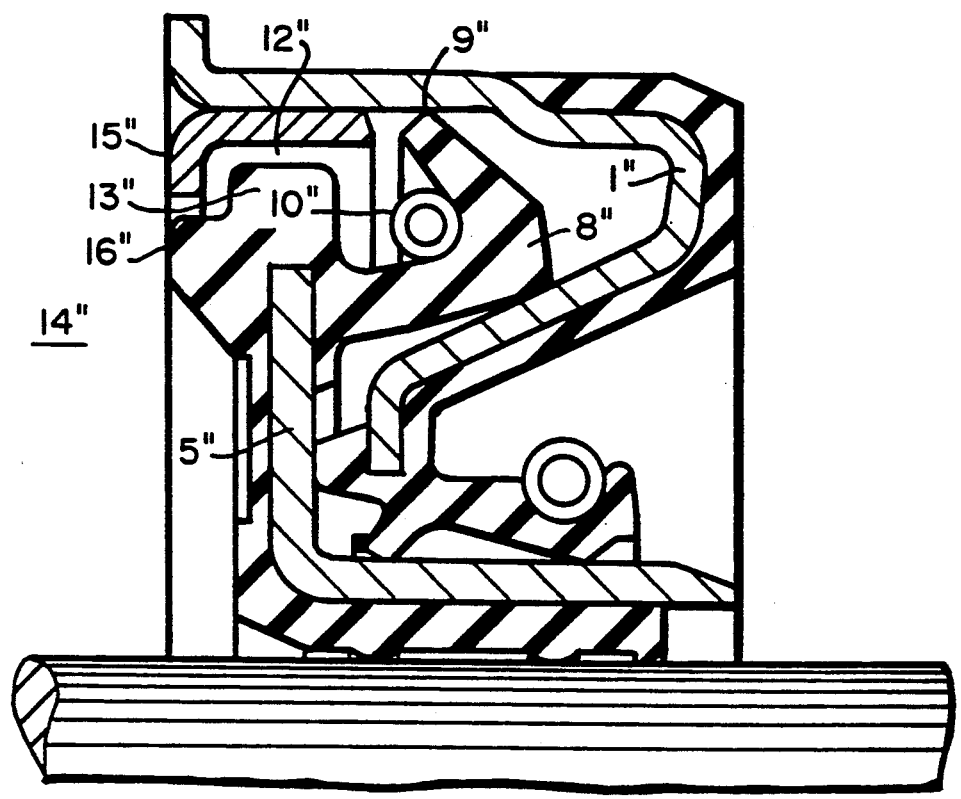
FIG. 3 is a cross-sectional view of a cartridge seal similar to that of FIG. 2 which includes an annular helical spring for the secondary seal.

The embodiment of FIG. 3 is identical to that of FIG. 2 with the addition of an annular helical spring 10'' for urging the first sealing lip 8'' against its corresponding counter surface.

There has thus been shown and described a novel cartridge seal which fulfills all the objects and advantages sought therefor. Many changes, modifications, variations and other uses and applications of the subject invention will, however, become apparent to those skilled in the art after considering this specification and the accompanying drawings which disclose the preferred embodiments thereof. All such changes, modifications, variations and other uses and applications which do not depart from the spirit and scope of the invention are deemed to be covered by the invention, which is to be limited only by the claims which follow.

What is claimed is:

1. In a cartridge seal adapted to be disposed between an axially rotatable shaft and a stationary member surrounding said shaft for sealing one lateral side of said seal with respect to the opposite lateral side, said seal including an outer ring defining an annular recess with a cross section having an axially open region facing said one side, an inner ring, a main seal which is attached to the outer ring by means of vulcanization and fittingly contacts said inner ring, said inner ring being provided with an annular projection which at least partially radially extends into said recess in said open region, and a preliminary seal which engages said outer ring in the recess and is attached to the annular projection by means of vulcanization, said preliminary seal contacting respective counter surfaces of said outer ring with a first and a second sealing lip in a relatively movable manner, the improvement wherein the first and the second sealing lips contact their corresponding counter surfaces with a first and second sealing edge respectively wherein the second sealing lip is formed by a projection extending from a side of the first sealing lip near said first sealing edge, said first and second sealing lips contacting said outer ring on opposite sides of said recess, said projection extending as one piece substantially axially outwardly from the first sealing lip; and wherein the first sealing lip is pressed against its corresponding counter surface by means of an annular helical spring.

2. The cartridge seal in accordance with claim 1, wherein a sealing gap is disposed upstream of the second sealing lip in direction toward said one side, and wherein the sealing gap is bounded on opposite sides by the annular projection and the outer ring.

3. The cartridge seal in accordance with claim 2, wherein, at least on one side, the sealing gap is bounded by a layer of rubber.

4. The cartridge seal in accordance with claim 2, wherein said sealing gap defines a path for the flow of fluid between said one side and the second sealing lip, and wherein the path of the sealing gap is redirected at least once.

5. The cartridge seal in accordance with claim 4, wherein the path is redirected by 75° to 90°.

6. The cartridge seal in accordance with claim 2, wherein at the end facing toward said one side, the sealing gap is bounded by facing surfaces which essentially are disposed in a radial plane and extend in a radial direction.

7. In a cartridge seal adapted to be disposed between an axially rotatable shaft and a stationary member surrounding said shaft for sealing one lateral side of said seal with respect to the opposite lateral side, said seal including an outer ring defining an annular recess with a cross section having an axially open region facing said one side, an inner ring, a main seal which is attached to the outer ring by means of vulcanization and fittingly contacts said inner ring, said inner ring being provided with an annular projection which at least partially radially extends into said recess in said open region, and a preliminary seal which engages said outer ring in the recess and is attached to the annular projection by means of vulcanization, said preliminary seal contacting respective counter surfaces of said outer ring with a first and a second sealing lip in a relatively movable manner, the improvement wherein the first and the second sealing lips contact their corresponding counter surfaces with a first and second sealing edge respectively; wherein the second sealing lip is formed by a projection extending from one side of a first sealing lip near said first sealing edge, said first and second sealing lips contacting said outer ring on opposite sides of said recess, said projection extending as one piece substantially axially outwardly from the first sealing lip; and wherein the first and second sealing lips are formed by converging boundary surfaces and wherein, together with their respective counter surfaces, the boundary surfaces extending toward the lips to guide fluid in the direction toward said one side form a more acute angle than do the converging boundary surfaces extending toward the lips to guide fluid in the direction away from said one side.

8. The cartridge seal in accordance with claim 7, wherein a sealing gap is disposed upstream of the second sealing lip in direction toward said one side, and wherein the sealing gap is bounded on opposite sides by the annular projection and the outer ring.

9. The cartridge seal in accordance with claim 8, wherein, at least on one side, the sealing gap is bounded by a layer of rubber.

10. The cartridge seal in accordance with claim 8, wherein said sealing gap defines a path for the flow of fluid between said one side and the second sealing lip, and wherein the path of the sealing gap is redirected at least once.

11. The cartridge seal in accordance with claim 10, wherein the path is redirected by 75° to 90°.

12. The cartridge seal in accordance with claim 8, wherein at the end facing toward said one side, the sealing gap is bounded by facing surfaces which essentially are disposed in a radial plane and extend in a radial direction.

13. The cartridge seal in accordance with claim 11, wherein the first sealing lip is pressed against its corresponding counter surface by means of an annular helical spring.

* * * * *